United States Patent Office

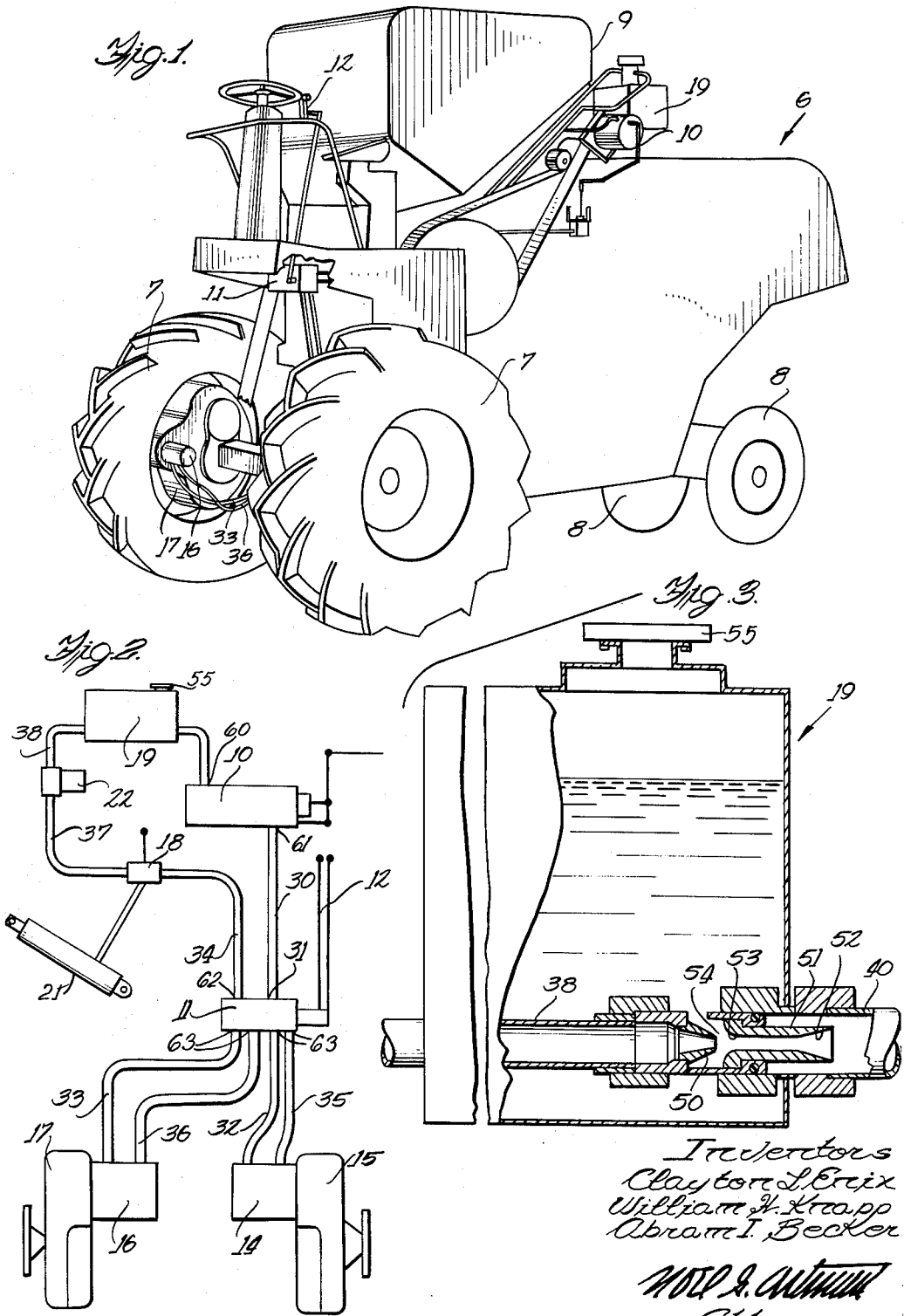

3,207,244
Patented Sept. 21, 1965

3,207,244
IMPLEMENT CARRIER HAVING
HYDROSTATIC DRIVE
Abram I. Becker, Plainfield, William H. Knapp, Naperville, and Clayton L. Enix, Hinsdale, Ill., assignors to International Harvester Company, Chicago, Ill., a corporation of New Jersey
Filed Dec. 31, 1962, Ser. No. 248,661
3 Claims. (Cl. 180—6.48)

The present invention relates generally to improvements in hydrostatic drives and the like and more particularly to new and improved hydrostatic drives for carrier-type vehicles.

Self-propelled implement carries, such as combines, cotton pickers, balers, forage harvesters and windrowers, have many advantages over the tractor-pulled implements and their popularity will increase when a superior and more economical drive system has been provided. A complete hydrostatic system, which replaces items such as the clutch, differential and central transmission, having hydraulic drive units at each drive wheel would provide superior field performance and also simplify the design of self-propelled carriers. In a system such as this there is no interference in the power train by the carrier and its implements. Also, the carrier can be provided with any number of driven wheels without changing the basic design. Those concerned with the development of carrier drive systems have long recognized the need for a hydrostatic drive that could be applied to such vehicles. The present invention fulfills this need.

A general purpose of this invention is to provide a hydrostatic drive which embraces all the advantages of similarly employed hydrostatic drives and possesses none of the afore-described disadvantages. To attain this, the present invention contemplates a system having a single engine driven pump and individual hydraulic motors at each driven wheel along with multiple range mechanical transmissions, available hydraulic power downstream from the ground-drive motors and an eductor for supplying said pump with pressurized flow of fluid.

An object of the present invention is the provision of a new and improved hydrostatic drive.

Another object is to provide a hydrostatic drive especially adaptable for self-propelled implement carriers.

A further object of the invention is the provision of a hydrostatic drive for a vehicle including individual multiple range transmissions at each driven wheel.

Still another object is to provide a hydrostatic drive including a single pump, to accomodate all hydraulic requirements of the vehicle.

Still another object is too provide a hydrostatic drive including an eductor for supplying the fluid to the pump under pressure.

These and other objects of the invention will become more apparent from the specification and drawings wherein:

FIGURE 1 is a perspective view of a self-propelled carrier including the new and improved hydrostatic drive;

FIGURE 2 is a diagrammatic view of the hydrostatic circuit; and

FIGURE 3 is a section view of the reservoir and eductor of the hydrostatic circuit.

Referring now to the drawings wherein like reference characters designate like or corresponding parts throughout the several views, there is shown in FIGURE 1 a combine generally designated 6 having a pair of front wheels 7, a pair of rear wheels 8 which may be of the caster type, and an engine 9 driving a hydraulic pump 10. The hydrostatic transmission utilized in the combine 6 to both drive the front wheels 7 and to operate implements such as raising and lowering the platform includes the engine driven pump 10 having a fluid input side 60 and a fluid output side 61, the direction control valve 11, the right hydraulic motor 16, the right multiple range transmission 17, the left hydraulic motor 14, left multiple range transmission 15, implement control valve 18, the reservoir 19 and the fluid lines connecting these elements.

The direction control valve 11 is provided with an input port 31, a return port 62 and four motor ports 63.

The specific construction of the multiple range transmissions and their interconnection to the hydraulic motors does not constitute a part of applicants' invention disclosed herein. Reference may be had to the Vogelaar Patent No. 2,818,126 issued on December 31, 1957, for a disclosure of a hydraulically driven combine having reduction gears mounted in the wheel rims that are driven by independent hydraulic motors. The term "multiple range transmissions" merely refers to a reduction gearbox wherein a plurality of ranges are available that can be selected by the operator through a shift lever. The direction of each of the front wheels 7 can be individually controlled by the drive control valve 11, and raising and lowering of the platform can be controlled to the implement control valve 18. The speed of the wheel 7 can be controlled through the left and right multiple range transmissions and through the variable delivery pump 10 or by controlling the engine's 9 speed.

The hydrostatic circuit is illustrated diagrammatically in FIGURE 2 and reference is hereby made to this figure. The variable delivery pump 10 pumps fluid under pressure through conduit 30 into the input port 31 of the direction control valve 11. The direction control valve 11 may be of conventional design such as is shown in U.S. patent to J. A. Lauck, No. 2,943,451 and issued July 5, 1960. Through the controls 12 of the direction control valve 11 fluid can be directed from the control valve 11 to the right hydraulic motor 16 through either line 33 or 36. If the fluid is directed to the motor 16 through line 33 it will then be returned from the motor 16 to the valve 11 through the line 36 and vice-versa. Whether the fluid is directed through line 33 or 36 determines which direction motor 16 shall be driven and thereby in which direction the wheel 7 will rotate. The controls 12 can be placed in a neutral position, in which fluid is prevented by valve 11 from flowing in either direction through lines 33 and 36. Under this condition the motor 16 is hydraulically locked and the right wheel 7 is, in effect, braked. If a sufficient force is applied to wheel 7 when the control 12 is in the neutral position a safety valve within control valve 11 would be opened to permit the wheel 7 to rotate.

The left hydraulic motor 14 and left multiple range transmission 15 are driven by fluid through lines 32 and 35 under the control of valve 11 in the same manner as the right motor 16 and transmission 17.

The implement control valve 18 is connected to the drive control valve by return conduit 34. When the drive controls 12 are both in the neutral position and no fluid is being directed to either motor 14 or 16 fluid under pump pressure flows through return conduit 34 to the implement control valve 18. When the controls 12 of the drive control valve are such the fluid is being directed to either or both of the motors 14 and 16 then the return fluid from the motors 14 and 16 is directed through return conduit 34 to the implement control valve 18. Thus under normal operating conditions the implement will utilize fluid discharged from the drive motors. This arrangement eliminates the need for a separate hydraulic pump and circuit for the implements. The implement control valve 18 at all times permits fluid to pass through the valve from return conduit 34 to line 37 and into the reservoir 19. However, when fluid is required to operate the implement cylinder 21 by opening the implement control valve 18 sufficient fluid is directed to the cylinder. Also when operation of the implement requires the cylinder 21 to discharge fluid, implement control valve 18 directs this fluid into line 37 and to the reservoir 19. The liquid in line 37 passes through a filter 22 and then into a continuation of line 37 designated 38 which extends through the reservoir wall and terminates in a nozzle 50. For a detailed disclosure of a valve of this type reference may be had to the Schneider et al. Re. 24,734 patent of November 17, 1959.

Referring now to FIGURE 3 which illustrates a section view of the reservoir and the eductor. Line 38 extends through the wall of the reservoir near the bottom thereof and terminates in a nozzle or jet 50. A continuation of line 38 is designated by reference numeral 40 and has secured internally thereof adjacent its open end a venturi tube 51 having a throat section 53 and a diverging section 52. There is an opening or discontinuation 54 between the ends of tubes 38 and 40, within the reservoir, through which fluid from the circuit can be added to the reservoir or reservoir fluid can be added to the circuit. The nozzle 50 is located with respect to the venturi tube 51 such that the fluid leaving the nozzle will be directed through the venturi tube. The converging section of the nozzle increases the velocity of the fluid in line 38 thereby creating a low-pressure area in the throat section 53 of the venturi tube. Fluid from the reservoir is drawn, by this low-pressure area into the circuit through the opening 54, thereby insuring a sufficient supply of fluid to the pump at all times. When the fluid reaches the diverging section 52 of the venturi tube its velocity is reduced and the pressure increased. The converging inlet of the nozzle 50 and the diverging section 52 of the venturi assures that the fluid will be accelerated as it approaches the venturi throat 53 and will then be de-accelerated as it approaches the outlet. This change in velocity takes place with a minimum of shock and loss of pressure between the inlet and outlet, thus fluid is supplied by the eductor to the variable delivery pump 10 at a sufficient charging pressure to prevent cavitation in the pump. The function of the nozzle and venturi tube eliminates the need for a separate charging pump in the system. The reservoir is provided with a vented cap 55 since the utilization of the above described eductor eliminates the need of a pressurized reservoir. Also, since the reservoir is at atmospheric pressure the drain lines to accommodate leakage from hydraulic components can be connected to the reservoir without being subjected to any back pressure.

The right and left multiple range transmissions 17 and 15 are of a type that fit within the rim of the vehicle wheel. The transmission ratios and the number of ranges, of course, depend upon the torque requirements of the machine on which the hydrostatic drive is being used. Since the cost of hydraulic pumps, motors, valves and lines increase very steeply as these items increase in size it has been found that an economic hydrostatic drive for vehicles must contain small line high pressure hydraulic systems having torque multiplications at the wheels. This system has been found to perform exceptionally well using a pump supplying fluid at approximately 20 gallons per minute at a pressure of 5,000 pounds per square inch.

By taking the hydraulic power for operating the implements downstream from the ground drive motors the implement speed will automaticelly be timed to the forward travel of the carrier. In many implements, such as a cotton picker, the picker drum speed must be timed with the forward speed of the implement which is automatically provided by the described hydrostatic drive.

It should be understood, of course, that the foregoing disclosure relates only to a preferred embodiment of the invention and that numerous modifications or alterations may be made therein without departing from the spirit and the scope of the invention as set forth in the appended claims.

What is claimed is:

1. In a self-propelled combine of the type having an engine, ground engaging wheels mounted on rims, hydraulic controlled implements; the improvement comprising a hydrostatic drive including a variable delivery pump having a fluid input side and a fluid output side driven by said engine; hydraulically-powered drive units mounted within said wheel rims and drivingly connected to said ground engaging wheels; a direction control valve having fluid input, return and motor ports, said directional control valve having conduits connecting the fluid output side of said pump to each of said hydraulic drive units through said directional control valve and conduits for returning fluid from each of said hydraulic drive units to said directional control valve, for individually controlling the fluid flow and its direction to said hydraulic drive units, said directional control valve having a return conduit connecting said return port to said input side of said variable delivery pump; a fluid take-off valve, between the return port of said direction control valve and the fluid input side of said pump, for controlling said hydraulic controlled implements; a fluid reservoir in said return conduit between said fluid take-off valve and the fluid input side of said pump, having an eductor for supplying said pump fluid above atmospheric pressure.

2. A hydrostatic drive for a vehicle comprising a variable delivery pump having a fluid input side and a fluid output side; drive units adapted to be mounted within the vehicle tire rims, including transmissions and hydraulic motors; a direction control valve having fluid input, return and motor ports, conduits connecting the output side of said pump to said input port and said motor ports to said hydraulic motors for individually controlling the flow and its direction to said hydraulic motors and conduits for returning fluid from said hydraulic motors to said directional control valve; a return conduit connecting said return port to said pump input side, a fluid take-off valve in said return conduit for actuating hydraulic components; a fluid reservoir in said return conduit, between said fluid take-off valve and the fluid input side of said delivery pump including a vented tank, a first tube extending from said fluid take-off valve into said tank and terminating within said tank in a nozzle, a second tube aligned with said first tube internally of said tank, there being a short discontinuation between said first and second tubes, such that the volume of fluid within the hydrostatic drive circuit will always be filled to capacity.

3. The invention as set forth in claim 2 wherein said second tube is a venturi formed internally thereof adjacent the aligned ends of said first and second tubes.

References Cited by the Examiner

UNITED STATES PATENTS

| 2,251,664 | 8/41 | Davis | 60—52 |
|---|---|---|---|
| 2,353,730 | 7/44 | Joy | 180—66 |
| 2,641,070 | 6/53 | Bennett | 180—6.48 X |
| 2,704,131 | 3/55 | Vahs | 180—6.48 X |
| 2,771,958 | 11/56 | Ball | 180—6.48 |
| 2,918,907 | 12/59 | Hausmann | 180—10 X |
| 3,055,448 | 9/62 | Fagel | 180—10 |

FOREIGN PATENTS 559,108    2/44    Great Britain.

PHILIP ARNOLD, *Primary Examiner.*

A. HARRY LEVY, *Examiner.*